US012762712B2

(12) United States Patent
Hassbring et al.

(10) Patent No.: US 12,762,712 B2
(45) Date of Patent: Oct. 13, 2026

(54) BACKGROUND OVERLAY ALPHA FADING

(71) Applicant: Axis AB, Lund (SE)

(72) Inventors: Ludvig Hassbring, Lund (SE); Mikael Murstam, Lund (SE)

(73) Assignee: Axis AB, Lund (SE)

( * ) Notice: Subject to any disclaimer, the term of this patent is extended or adjusted under 35 U.S.C. 154(b) by 118 days.

(21) Appl. No.: 18/439,209

(22) Filed: Feb. 12, 2024

(65) Prior Publication Data

US 2024/0355021 A1 Oct. 24, 2024

(30) Foreign Application Priority Data

Apr. 20, 2023 (EP) .................................... 23168944

(51) Int. Cl.

| | |
|---|---|
| ***G06T 7/194*** | (2017.01) |
| ***G06T 7/20*** | (2017.01) |
| ***G06T 7/60*** | (2017.01) |
| ***G06T 11/60*** | (2026.01) |

(52) U.S. Cl.

CPC ................ *G06T 7/194* (2017.01); *G06T 7/20* (2013.01); *G06T 7/60* (2013.01); *G06T 11/60* (2013.01); *G06T 2207/20092* (2013.01); *G06T 2210/12* (2013.01)

(58) Field of Classification Search

CPC . G06T 11/60; G06T 7/194; G06T 7/20; G06T 7/60; G06T 2207/20092; G06T 2210/12; G06V 20/41

USPC .......................................................... 345/637

See application file for complete search history.

(56) References Cited

U.S. PATENT DOCUMENTS

| | | | | |
|---|---|---|---|---|
| 10,757,347 | B1 | 8/2020 | Corwin et al. | |
| 2002/0196370 | A1 | 12/2002 | Dagtas et al. | |
| 2013/0063736 | A1* | 3/2013 | Chiba | G06F 40/103 358/1.6 |
| 2015/0078733 | A1 | 3/2015 | Popkiewicz et al. | |
| 2016/0314622 | A1 | 10/2016 | Davis et al. | |
| 2017/0094196 | A1* | 3/2017 | Adsumilli | G06T 7/174 |
| 2019/0279407 | A1* | 9/2019 | McHugh | G06F 3/011 |
| 2020/0314356 | A1* | 10/2020 | Storer | G06T 7/50 |
| 2021/0158553 | A1 | 5/2021 | Ichikawa et al. | |
| 2022/0398704 | A1* | 12/2022 | Sun | G06T 5/70 |
| 2024/0135509 | A1* | 4/2024 | Liu | G06T 5/77 |
| 2024/0169541 | A1* | 5/2024 | Zhang | G06T 7/11 |
| 2024/0177479 | A1* | 5/2024 | Yen | G06F 18/00 |

OTHER PUBLICATIONS

Communication pursuant to Article 94(3) EPC dated Dec. 19, 2024 for European Patent Application No. 23168944.9.

* cited by examiner

*Primary Examiner* — David T Welch

(74) *Attorney, Agent, or Firm* — Volpe Koenig

(57) ABSTRACT

Methods and apparatus, including computer program products, implementing and using techniques for controlling the display of an overlay in a video. An overlay to be displayed in a video is defined. An overlay area is defined, which includes the overlay. At least one foreground object in the video is defined. A spatial overlap between the foreground object and the overlay area is determined. In response to determining that a size of the spatial overlap exceeds a first threshold, the entire overlay is stopped from being displayed within the overlay area.

20 Claims, 4 Drawing Sheets

BACKGROUND OVERLAY ALPHA FADING

BACKGROUND

The present invention relates to video processing, and more specifically, to using overlays in a video sequence.

An overlay in a video is a visual element that is added to a video footage or image to provide additional information or enhance its visual appeal. Overlays can include, for example, graphics, text, animations, or other visual effects that are superimposed on top of the original video footage or image.

Common types of overlays used in videos include watermarks, logos, captions, subtitles, callouts, borders, and filters. Overlays can be used to add context, convey a message, emphasize a point, or add an artistic effect to a video. They can also be used to hide unwanted parts of a video.

Overlays are usually added during post-production using video editing software, and they can be customized in terms of their size, position, opacity, and duration. The use of overlays is a popular technique in video production and can greatly enhance the visual appeal and impact of a video.

A drawback with overlays is that they cover potentially vital information in the scene. One solution to this problem is to make the overlay be part of the background. This makes it possible for a foreground object in the video to be visible in front of the overlay. FIG. 2A schematically shows one example of such a scenario with three video frames 206-210 captured at times T1, T2 and T3, respectively. As can be seen in FIG. 2A, an overlay 204 "STORGATAN" forms part of the background in each video frame. A foreground object 202, in the present case a car, moves across the series of video frames from left to right during times T1, T2 and T3, respectively. In video frame 208, the car 202 is positioned in front of the overlay 204, thus obscuring part of the overlay 204. This may be desirable in terms of maintaining the continuity of the foreground object 202 as it travels past the section of the background that contains the overlay. However, if the car 202 parks in front of the overlay 204 for an extended period of time, this solution with the overlay being part of the background becomes less useful, as the car 202 obscures the overlay 204 and the useful information provided by the overlay 204 will no longer be visible. Thus, there is a need for better overlay management in a video sequence.

SUMMARY

In one aspect, methods and apparatus, including computer program products, are provided for controlling the display of an overlay in a video. An overlay to be displayed in a video is defined. An overlay area is defined, which includes the overlay. At least one foreground object in the video is defined. A spatial overlap between the foreground object and the overlay area is determined. In response to determining that a size of the spatial overlap exceeds a first threshold, the entire overlay is stopped from being displayed within the overlay area.

Various embodiments may include one or more of the following features. The second threshold can be the same as the first threshold. A timer can be started in response to the stopping of displaying the entire overlay within the overlay area, and reintroducing the overlay can occur when the timer reaches a predetermined value. Reintroducing the overlay can include changing an alpha value of pixels included in the overlay. The alpha value can be changed at a pre-determined rate to achieve a fade-in effect. The rate can depend on an amount of time during which the size of the spatial overlap has exceeded the first threshold.

Determining the spatial overlap can be done by determining a ratio between the number of pixels in the overlay area that belong to the foreground object and the total number of pixels in the overlay area. Determining the spatial overlap can further take into account a position within the overlay area of the pixels belonging to the foreground object. Defining at least one foreground object in the video can be done by using a motion-based foreground-background detection algorithm. Defining at least one foreground object in the video can be done by using an object detection algorithm, and classifying pixels belonging to detected objects as foreground pixels and pixels not belonging to detected objects as background pixels.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

In the following, the invention will be described in detail, with reference to exemplifying embodiments of the invention and to the enclosed drawings, wherein.

DETAILED DESCRIPTION

The various embodiments of the invention pertain to techniques for managing overlays in videos. The above described, prior art models use a background-foreground model based on motion, where the pixels of the foreground object take precedence over pixels in the overlay. In some embodiments, the model is implemented with a timeout, that is, if a pixel no longer registers movement over a time period, the pixel once again becomes background. In some embodiments, this timeout can be set manually. Again, referring back to the example described in the background section where the overlay is a street name and the foreground object is a car passing by, the timeout can be set to a suitable value such that the overlay appears over the car after some time in the event that the car parks in front of the overlay. However, since this prior art model operates on a pixel-by-pixel-basis, the entire overlay may not become visible at the same time once the pixels begin to become part of the background. This can make the overlay spotty and difficult to read.

The various embodiments of the invention presented herein address this issue by defining a bounding box around the overlay to define an overlay area. When the foreground object enters the overlay area and a sufficient portion of the overlay area is covered by the foreground object (as defined by a threshold value), the entire overlay is stopped from being displayed. That is, instead of changing the display on a pixel-by-pixel basis, all the pixels within the overlay area are changed at the same time once a sufficient portion of the overlay area is covered by the foreground object. Similar, once the foreground object disappears from the overlay area and covers a smaller portion of the overlay area than what is specified by the threshold value, the entire overlay returns at the same time. Further, similar to the existing methods, a timer can be used to accommodate situations where the foreground object remains in front of the overlay for an extended period of time (e.g., a car parking in front of the overlay, as described above). As will be described in further detail below, in some embodiments where text is covered by the foreground object, rather than changing all pixels in the within the overlay area, the pixels can be changed on a letter-by-letter basis, as the letters of the text get covered and uncovered by the foreground object. Various embodiments will now be described in further detail by way of example and with reference to the drawings.

Figure 1:
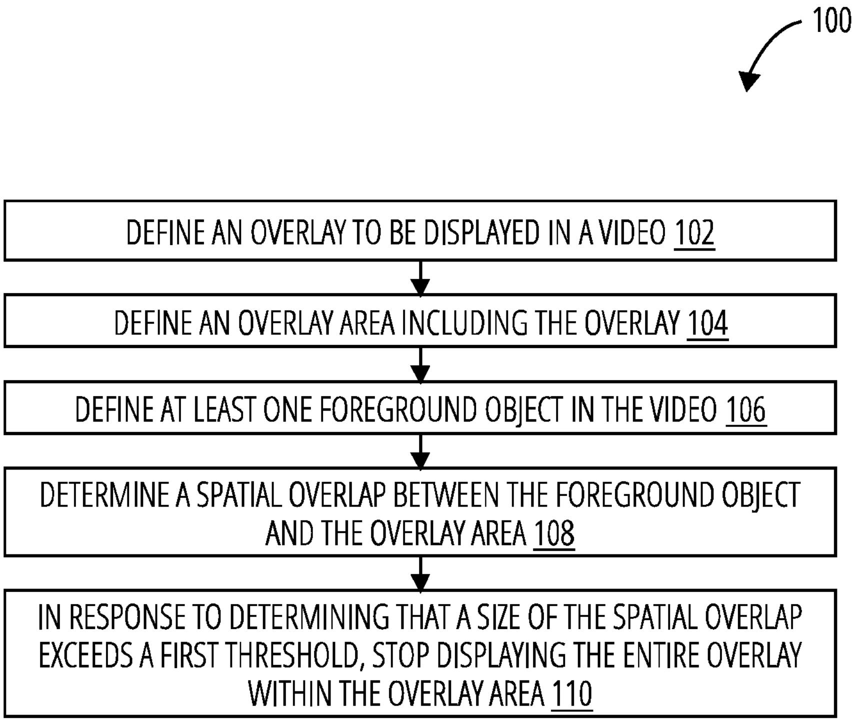
FIG. 1 illustrates a routine 100 for controlling the display of an overlay onto a background a video, in accordance with some embodiments.
Figure 2A:
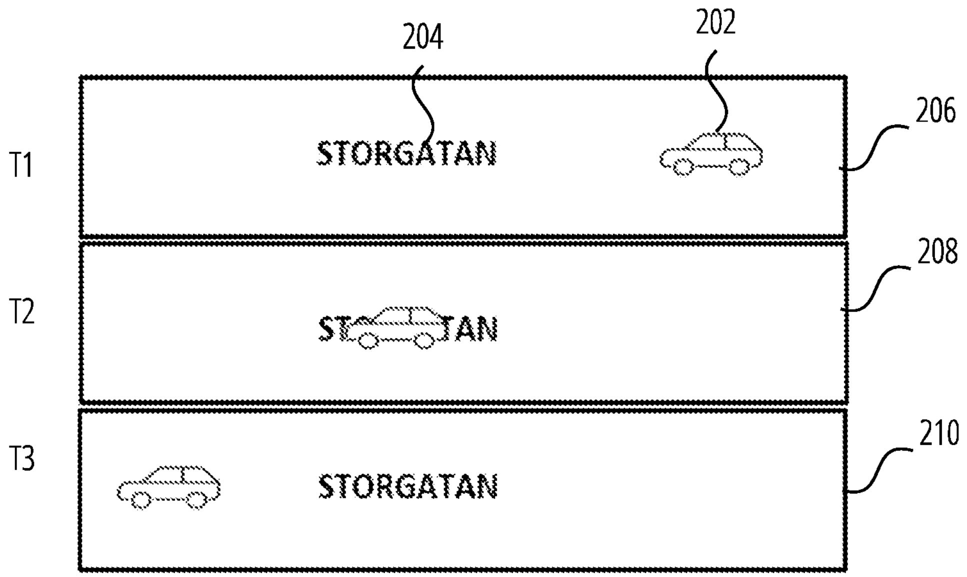
FIG. 2A (PRIOR ART)
FIG. 2A shows a sequence of three video frames, each containing an overlay and a foreground object, in accordance with a prior art embodiment.
Figure 2B:
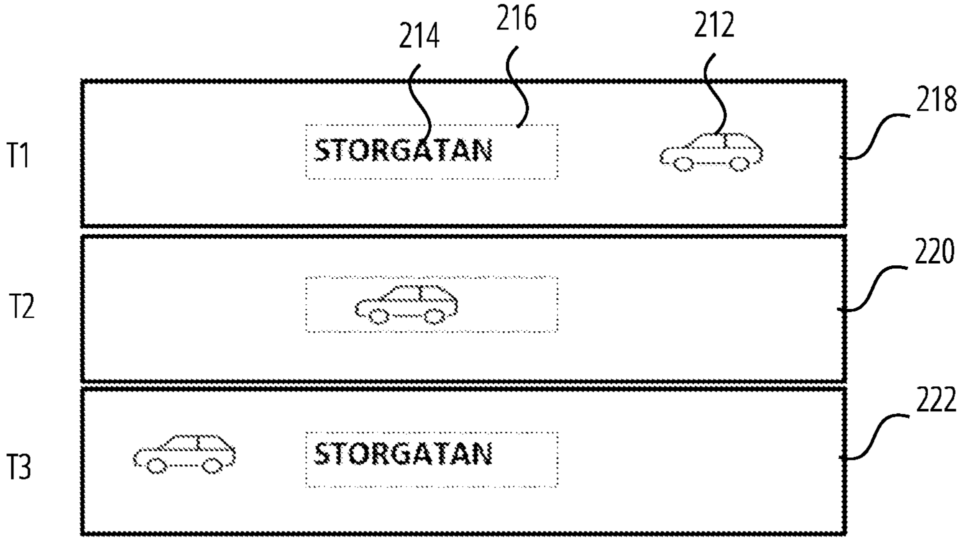
FIG. 2B shows a sequence of three video frames corresponding to the ones shown in FIG. 2A, each containing an overlay and a foreground object, in accordance with some embodiments of the invention.

As can be seen in FIG. 1 and FIG. 2B, respectively, the method in accordance with one embodiment starts by defining an overlay 214 to be displayed in a video, 102. The overlay can be defined using any conventional method. Next, an overlay area 216 is defined, which includes the overlay 214. Typically, the overlay area 216 is defined by means of a bounding box around the overlay 214, which can either be done manually by a user or automatically by the system, based on the shape and size of the overlay 214. It should be noted that although the term "box" is used in this context, the bounding box should not be construed as being restricted to a square or rectangular shape. Rather, any geometrical shape that can contain the overlay 214 can be used in this context. Typically, the overlay area 216 is approximately the same size as the overlay 214 itself, but this is not a requirement, and it should be realized that the overlay area 216 may either be larger or smaller than the overlay 214 itself in various embodiments. It should further be realized that while only a single overlay 214 and overlay area 216, respectively, is shown in FIG. 2B, this is done for illustration purposes only, and in a real world implementation, there may be several overlays 214 and overlay areas 216 in any given video frame.

Once the overlay 214 and overlay area 216 have been defined, at least one foreground object 212 is also defined in the video, such as the car 212 illustrated in FIG. 2B, 106. Many types of background foreground algorithms exist that are well known to those having ordinary skill in the art and which can be used to identify foreground objects. At a very high level, the background foreground algorithms typically involve three steps: background modeling, foreground detection, and object tracking. The first step is to model the background of the scene. This is done by analyzing a sequence of frames and estimating the pixels that belong to the background. The most common method for background modeling is to use a statistical model such as a Gaussian Mixture Model (GMM) or a non-parametric model such as a Kernel Density Estimator (KDE). Once the background model is estimated, the next step is to detect the foreground objects. This is done by comparing each frame of the video to the background model. Pixels that differ significantly from the background model are classified as foreground pixels. Various methods can be used to compare the frame with the background model, such as absolute difference, temporal differencing, and frame differencing. The final step is to track the detected objects across the video frames. This can be done using various techniques such as blob tracking or object tracking algorithms such as a Kalman filter.

When a foreground object 212 has been identified, a spatial overlap between the foreground object 212 and the overlay area 216 is determined, 108. This can be done, for example, by counting the number of pixels within the overlay area 216 that belong to the foreground object 212 in a given video frame, to arrive at a percentage of the overlay area 216 being covered by the foreground object 212. In some embodiments, the algorithm may also take into account the location of the pixels that are covered by the foreground object 212 within the overlay area 216, for example, by assigning a weight factor to different pixels in different areas of a video frame. For example, pixels closer to the center of an overlay 214 may be considered more "relevant" than pixels at the periphery of the overlay.

Finally, in when the spatial overlap exceeds a first threshold, the entire overlay 214 within the overlay area 216 is stopped from being displayed, 110. Typically, the first threshold is set by a user, for example, as a percentage of the pixels within the overlay area 216 being covered by the foreground object 212 (generally somewhere in the range 25-50% of the pixels, such as 33%, but other ranges are also possible). The first threshold can also be set automatically, for example, based on the appearance of the scene (e.g., light conditions, objects included, etc.). The first threshold does not need to be constant. For example, a time varying threshold can be set, such that certain overlays (e.g., the name of a business establishment) may not be affected during certain times of the day (e.g., hours when the business establishment is not open). In some embodiments, different overlays may have different associated thresholds.

The stopping of the overlay 214 within the overlay area 216 from being displayed can occur in many different ways. For example, in one implementation, all the pixels included in the overlay area 216 are gradually faded by decreasing the pixels' alpha values from one (i.e., fully visible) to zero (i.e., invisible) for normalized alpha values. Alpha values is a well-known concept in image processing, and refers to the transparency or opacity of a pixel. If an image has an alpha value of zero at a certain pixel, that pixel will be fully transparent and any underlying image or background will be visible through the pixel. On the other hand, if the pixel has an alpha value of one, that pixel will be fully opaque and its color will completely obscure any underlying image or background. In some embodiments, to achieve a smooth transition from the overlay being fully visible to the overlay being invisible, the alpha value of the pixels is faded at a certain rate. FIG. 2B illustrates in video frame 220 how all the pixels in the overlay 214 have been made transparent. As can be seen in video frame 222 of FIG. 2B, once the foreground object 212 no longer covers a certain portion of the overlay area 216, the entire overlay 214 reappears again.

As was noted above, in some embodiments, in conjunction with making the pixels of the overlay 214 invisible, a timer or counter (e.g., an image frame counter) may be started, which can be preset by a user (or automatically) to a time (or number of frames) at which the overlay 214 should start reappearing in the overlay area 216. For example, if no pixels belonging to the foreground object 212 (e.g., the car) have changed for five minutes, then it may be concluded that the car is parked, and that the overlay 214 may be reintroduced by changing the alpha value for all the pixels of the overlay 214 from zero to one. This causes the entire overlay 214 to reappear at the same time, rather than pixel by pixel, as is the case with the prior art implementations, thereby creating a more aesthetically pleasing result.

Furthermore, just like the overlay 214 was faded at a certain rate, as described above, it can be reintroduced at a certain rate (which may be the same or different from the fading rate). As was noted above, in some embodiments, this concept can be implemented on a letter-by-letter basis, such that when a certain portion of a letter in an overlay is covered by a foreground object, that letter (but not other letters in the overlay) disappears, and subsequently reappears, as described above. It should also be noted that while the expression "timer" is used in this document, a counter of some kind may be used instead in some embodiments, for example, to count a number of video frames. This is merely an implementation matter, since a certain number of video frames simply is a different way of quantifying a certain elapsed time, so all reference herein to "time" or "timer" equivalently apply to "number of video frames" or "counter."

In some embodiments, the rate at which the overlay 214 is faded in depends on how long the overlay 214 has been covered by the foreground object 212, i.e., the value of the timer. For example, the fade-in rate may be inversely proportional to the timer. Thus, a car or person quickly passing by the overlay 214 causes the overlay 214 to reappear more quickly, or almost instantaneously, compared to when the person or car stops in front of the overlay 214. Again, it should be realized that this is merely one implementation and that there are many ways in which fade-in or fade-out rates could be determined, which fall well within the capabilities of the skilled artisan.

Figure 3:
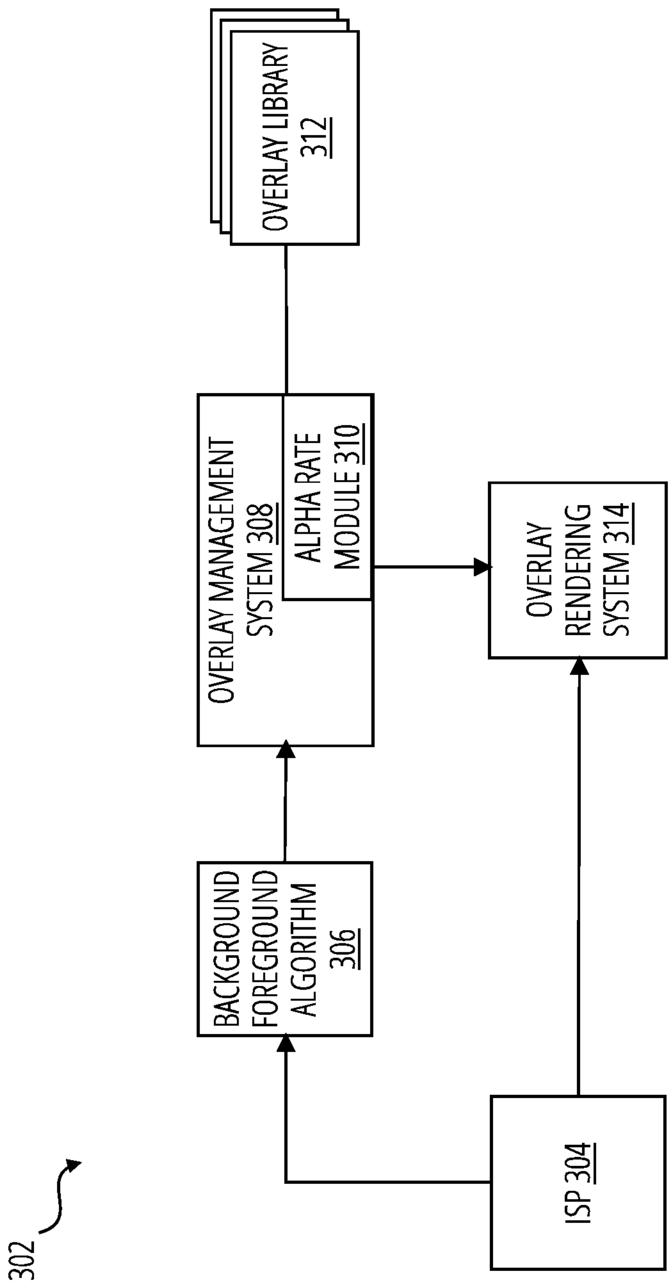
FIG. 3 illustrates an aspect of the subject matter in accordance with some embodiments of the invention.

FIG. 3 shows a system 302 in accordance with some embodiments that can be used to implement the above-described methods. As can be seen in FIG. 3, the system 302 includes an Image Signal Processor (ISP) 304. The ISP is used for processing images and performs other operations on the captured image such as demosaicing, denoising, and auto functions that help deliver an enhanced image, as is well known to those having ordinary skill in the art. The ISP 304 sends its processed image to a background foreground algorithm 306, which identifies foreground and background objects and more specifically, what pixels in the image belong to the foreground and what pixels belong to the background. This identification can be either motion- or Artificial Intelligence (AI) based. In some embodiments, as an alternative to AI-based background foreground algorithms 306, object-detecting AI algorithms can be used, where all pixels belonging to the identified objects are classified as foreground object pixels and all other pixels are classified as background pixels. It should also be noted, that it is not a requirement to use a fully processed image from the ISP 304. As long as the image is obtained in a consistent manner from the ISP 304, the techniques described herein will work well, even though the image may only be partly processed by the ISP 304.

The background foreground algorithm 306 sends information for each pixel in the image to an overlay management system 308. The overlay management system 308 performs the processing described above, and can in some embodiments include an alpha rate module 310 for calculating the fade-in and fade-out rates, respectively, as described above. The overlay management system 308 also communicates with an overlay library 312, which contains information for each overlay that is used in the image. This information can include, for example, information about the position, size, and text for the overlay 214, information about the overlay area 216, and information about the fade-in and/or fade-out rate for each particular overlay.

The output from the overlay management system 308 includes overlay color data and overlay alpha data, respectively, which is sent to an overlay rendering system 314. The overlay rendering system 314 combines this information with the image received from the ISP 304 and creates the final image to be displayed to the user.

In some embodiments, rather than counting the number of pixels in the overlay area 216 that are covered by the foreground object 212, the number of letters is counted and correlated to determine what portion of the actual text is covered, rather than the portion of the overlay area 216.

Figure 4:
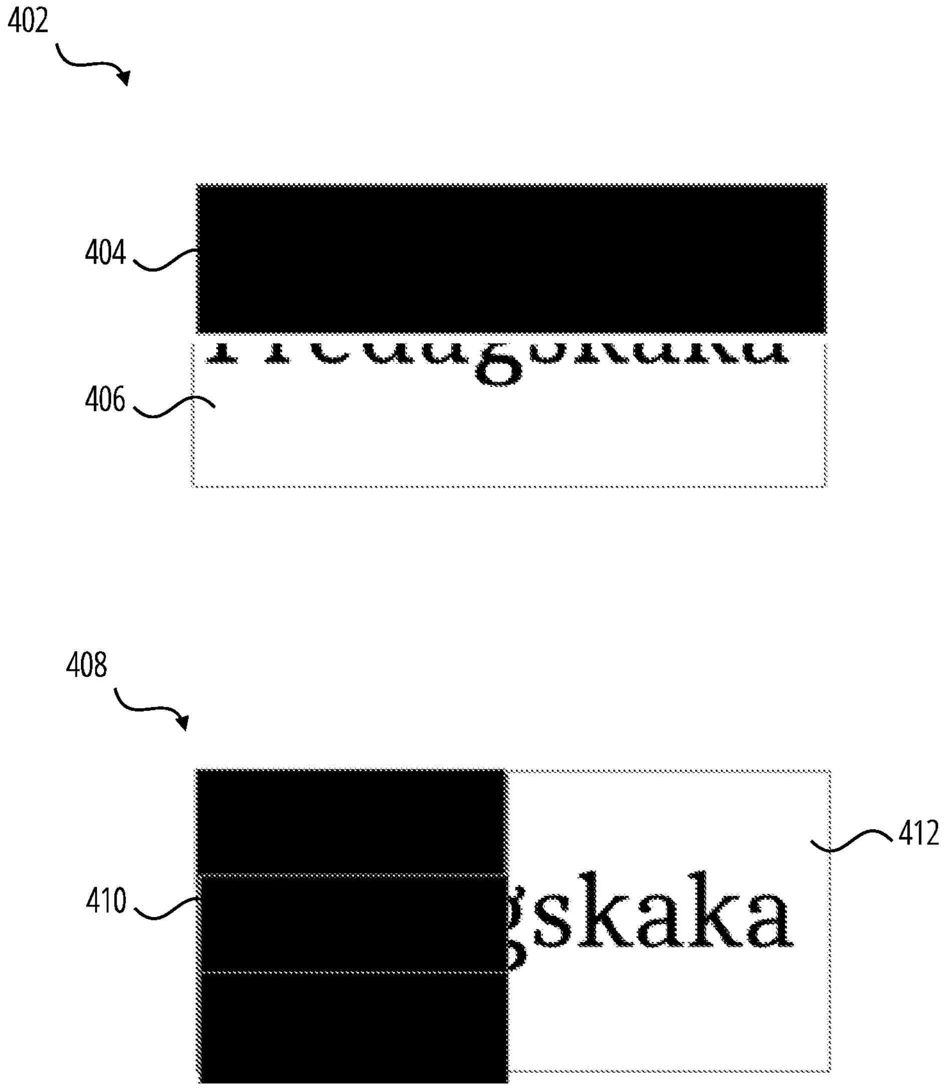
FIG. 4 illustrates an aspect of the subject matter in accordance with some embodiments of the invention.

FIG. 4 shows an alternative way of assigning different weights to different portions of a partly covered overlay 214, which can be used to determine if, when and how, fade-in and fade-out, respectively, of the overlay should occur. FIG. 4, shows two overlays 402 and 408 that each have approximately 50% of their respective areas covered by a black foreground object 404 and 410 respectively. In overlay 402, the foreground object 404 partly covers the letters in a vertical direction and in overlay 408, the foreground object 410 partly covers the letters in a horizontal direction. However, despite the coverage being approximately 50% in both cases, it is generally more difficult for a user to figure out the text of overlay 402 compared to the text of overlay 410. Thus, the overlays 402 and 410, respectively, may be treated differently due to the geometry of the foreground object's coverage. The geometry of the coverage can be determined, for example, by counting the number of covered pixels in each row of pixels. An overlay having a number of completely covered rows will generally be perceived as more difficult to read compared an overlay having a larger number of semi-covered rows. Again, this is merely one way to determine how the geometry of the coverage of the foreground object 212 may affect how the overlay 214 is processed, and many other alternative methods fall within the scope of the appended claims.

The embodiments of the present invention described herein also relates to a computer software function for controlling the display of an overlay in a video, according to what has been described above. Such a computer software function is then arranged to, when executing, perform the above-described defining, determining, and stopping displaying operations, which are also recited in the claims. The computer software function is arranged to execute on physical or virtual hardware of the computer, as described above.

Embodiments of the subject matter and the functional operations described in this specification can be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

While this specification contains many implementation details, these should not be construed as limitations on the scope of the invention or of what may be claimed, but as descriptions of features specific to implementations of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments. The described program components and systems can be integrated into a single software product or packaged into multiple software products.

Thus, embodiments of the invention have been described. Other embodiments are within the scope of the following claims. For example, in some embodiments one or more overlay areas may be related to one another, such that when a foreground object covers a sufficient portion of one overlay area, then several overlays in the video frame are affected in the manners described above. There are also embodiments in which the overlay area and the overlay do not overlap, but where the overlay area simply represents a certain area of the video frame and one or more overlays are associated with the overlay area, irrespective of the positions of the overlays in the video frame. There may also be other alternative ways of detecting foreground objects, for example, by using object detecting artificial intelligence (AI) techniques, which segment objects and provide a pixel-per-pixel likelihood that a pixel belongs to a foreground object. Thus, many variations to the above examples lie well within the scope of the attached claims and within the capabilities of a person having ordinary skill in the art.

The invention claimed is:

1. A method for controlling a display of an overlay in a video of a scene, comprising:

defining the overlay to be displayed or stopped in the video;

defining an overlay area including the overlay;

defining at least one foreground object of the scene in the video;

determine whether a spatial overlap is present in a video frame of the video between the foreground object and the overlay area such that a first portion of the overlay defined by the spatial overlap is blocked by the foreground object and a second portion of the overlay is not blocked by the foreground object, wherein the first portion and the second portion comprise an entirety of the overlay;

determining a size of the spatial overlap based on a number of pixels in the overlay area that belong to the foreground object and a total number of pixels in the overlay area and whether the size exceeds a first threshold; and in response to determining that the size of the spatial overlap in the video frame exceeds the first threshold, stopping a display of the entirety of the overlay, wherein said stopping results in pixels corresponding to the first portion and pixels corresponding to the second portion being fully transparent or invisible.

2. The method of claim 1, wherein the size of the first threshold is related to a size of the overlay area.

3. The method of claim 1, wherein stopping the display of the overlay includes changing an alpha value of pixels included in the overlay area.

4. The method of claim 3, wherein the alpha value is changed at a pre-determined rate to achieve a fade-out effect.

5. The method of claim 4, wherein the pre-determined rate is selectable by a user.

6. The method of claim 1, further comprising:

reintroducing the overlay when the size of the spatial overlap falls below a second threshold.

7. The method of claim 6, wherein the second threshold is the same as the first threshold.

8. The method of claim 6, further comprising starting a timer in response to the stopping of displaying the entire overlay within the overlay area, and wherein reintroducing the overlay occurs when the timer reaches a predetermined value.

9. The method of claim 6, wherein reintroducing the overlay includes changing an alpha value of pixels included in the overlay.

10. The method of claim 9, wherein the alpha value is changed at a pre-determined rate to achieve a fade-in effect.

11. The method of claim 1, wherein determining the spatial overlap further takes into account a position within the overlay area of the pixels belonging to the foreground object.

12. The method of any claim 1, wherein defining at least one foreground object in the video is done by using a motion-based foreground-background detection algorithm.

13. The method of claim 1, wherein defining at least one foreground object in the video is done by using an object detection algorithm, and classifying pixels belonging to detected objects as foreground pixels and pixels not belonging to detected objects as background pixels.

14. The method of claim 1, wherein the first threshold comprises a percentage of pixels within the overlay area being covered by the foreground object.

15. The method of claim 1, wherein the method comprises automatically setting the first threshold based on an appearance of the scene.

16. The method of claim 1, wherein the overlay is one of a plurality of overlays corresponding to a plurality of letters to enable a letter-by-letter display, further comprising:

when a certain portion of a letter is covered by the foreground object, stopping display of said letter.

17. The method of claim 1, in response to determining that the size of the spatial overlap in the video frame does not exceed the first threshold, displaying the entire overlay within the overlay area.

18. The method of claim 1, wherein all pixels of the entirety of the overlay reappear from being fully transparent or invisible based on an image frame counter concluding a count.

19. A non-transitory computer-readable storage medium, the computer-readable storage medium including instructions that when executed by a computer, cause the computer to:

define an overlay to be displayed or stopped in a video of a scene;

define an overlay area including the overlay;

define at least one foreground object of the scene in the video;

determine whether a spatial overlap is present in a video frame of the video between the foreground object and the overlay area such that a first portion of the overlay defined by the spatial overlap is blocked by the foreground object and a second portion of the overlay is not blocked by the foreground object, wherein the first portion and the second portion comprise an entirety of the overlay;

determining a size of the spatial overlap based on a number of pixels in the overlay area that belong to the foreground object and a total number of pixels in the overlay area and whether the size exceeds a first threshold; and in response to determining that the size of the spatial overlap in the video frame exceeds the first threshold, stop a display of the entirety of the overlay; wherein said stop of the display of the entirety of the overlay results in pixels corresponding to the first portion and pixels corresponding to the second portion being fully transparent or invisible.

20. A computing apparatus comprising:

a processor; and a memory storing instructions that, when executed by the processor, configure the apparatus to:

define an overlay to be displayed or stopped in a video of a scene;

define an overlay area including the overlay;

define at least one foreground object of the scene in the video;

determine whether a spatial overlap is present in a video frame of the video between the foreground object and the overlay area such that a first portion of the overlay defined by the spatial overlap is blocked by the foreground object and a second portion of the overlay is not blocked by the foreground object, wherein the first portion and the second portion comprise an entirety of the overlay;

determining a size of the spatial overlap based on a number of pixels in the overlay area that belong to the foreground object and a total number of pixels in the overlay area and whether the size exceeds a first threshold; and in response to determining that the size of the spatial overlap in the video frame exceeds the first threshold, stopping a display of the entirety of the overlay;

wherein said stop of the display of the entirety of the overlay results in pixels corresponding to the first portion and pixels corresponding to the second portion being fully transparent or invisible.

* * * * *